US008276389B2

(12) United States Patent
Charron et al.

(10) Patent No.: US 8,276,389 B2
(45) Date of Patent: Oct. 2, 2012

(54) ASSEMBLY FOR DIRECTING COMBUSTION GAS

(75) Inventors: Richard C. Charron, West Palm Beach, FL (US); Raymond S. Nordlund, Orlando, FL (US); Jay A. Morrison, Titusville, FL (US); Ernie B. Campbell, Orlando, FL (US); Daniel J. Pierce, Port St. Lucie, FL (US); Matthew D. Montgomery, Jupiter, FL (US); Jody W. Wilson, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 13/096,041

(22) Filed: Apr. 28, 2011

(65) Prior Publication Data

US 2011/0203282 A1 Aug. 25, 2011

Related U.S. Application Data

(63) Continuation-in-part of application No. 12/420,149, filed on Apr. 8, 2009.

(60) Provisional application No. 61/100,853, filed on Sep. 29, 2008.

(51) Int. Cl.
*F02C 3/00* (2006.01)

(52) U.S. Cl. ........................................ 60/752; 60/39.37

(58) Field of Classification Search .................... 60/752, 60/799, 39.37, 269, 804, 805, 722, 226.1, 60/263, 264, 753–760, 806

See application file for complete search history.

(56) References Cited

U.S. PATENT DOCUMENTS

| | | | | |
|---|---|---|---|---|
| 2,567,079 | A | 9/1951 | Owner et al. | |
| 3,608,310 | A | 9/1971 | Vaught | |
| 3,804,335 | A | 4/1974 | Sohre | |
| 5,761,898 | A | 6/1998 | Barnes et al. | |
| 5,953,919 | A | 9/1999 | Meylan | |
| 6,644,032 | B1 | 11/2003 | Jorgensen et al. | |
| 7,958,734 | B2 * | 6/2011 | Paprotna et al. | 60/800 |
| 2007/0017225 | A1 | 1/2007 | Bancalari et al. | |
| 2010/0037617 | A1 | 2/2010 | Charron et al. | |
| 2010/0077719 | A1 | 4/2010 | Wilson et al. | |

* cited by examiner

*Primary Examiner* — William H Rodriguez
*Assistant Examiner* — Vikansha Dwivedi

(57) ABSTRACT

An arrangement (10) for conveying combustion gas from a plurality of can annular combustors to a turbine first stage blade section of a gas turbine engine, the arrangement (10) including a plurality of interconnected integrated exit piece (IEP) sections (16) defining an annular chamber (18) oriented concentric to a gas turbine engine longitudinal axis (20) upstream of the turbine first stage blade section. Each respective IEP (16) includes a first flow path section (40) receiving and fully bounding a first flow from a respective can annular combustor along a respective common axis (22) there between, and delivering a partially bounded first flow to a downstream adjacent IEP section (42). Each respective IEP further includes a second flow path section (112) receiving a partially bounded second flow from an upstream adjacent IEP (66) and delivering at least part of the second flow to the turbine first stage blade section.

47 Claims, 11 Drawing Sheets

ASSEMBLY FOR DIRECTING COMBUSTION GAS

This application is a continuation-in-part of U.S. patent application Ser. No. 12/420,149 to Wilson et al., filed 8 Apr. 2009 which in turn claims priority to U.S. provisional application No. 61/100,853 filed 29 Sep. 2008, both of which are incorporated by reference herein.

FIELD OF THE INVENTION

This invention relates to gas turbine combustion engines. In particular, this invention relates to an assembly for transporting expanding gasses to the first row of turbine blades.

BACKGROUND OF THE INVENTION

Gas turbine combustion engines with can annular combustors require structures to transport the gasses coming from the combustors to respective circumferential portions of the first row of turbine blades, hereafter referred to simply as the first row of turbine blades. These structures must orient the flow of the gasses so that the flow contacts the first row of turbine blades at the proper angle, to produce optimal rotation of the turbine blades. Conventional structures include a transition, a vane, and seals. The transition transports the gasses to the proper axial location and directs the gasses into the vanes, which orient the gas flow circumferentially as required and deliver the gas flow to the first row turbine of blades. The seals are used in between the components to prevent cold air leakage into the hot gas path, and to smooth flow during the transition between the components.

Configurations of this nature reduce the amount of energy present in the gas flow as the flow travels toward the first row of turbine blades, and inherently require substantial cooling. Gas flow energy is lost through turbulence created in the flow as the flow transitions from one component to the next, and from cold air leakage into the hot gas path. Cold air leakage into the hot gas path through seals increases as seals wear due to vibration and ablation. Significant energy is also lost when the flow is redirected by the vanes. These configurations thus create inefficiencies in the flow which reduce the ability of the gas flow to impart rotation to the first row of turbine blades.

The cooled components are expensive and complicated to manufacture due to the cooling structures, exacting tolerance requirements, and unusual shapes. Layers of thermal insulation for such cooled components may wear and can be damaged. For example, vane surfaces and thermal insulation layers thereon are prone to foreign object damage due to their oblique orientation relative to the flow. Such damage may necessitate component repair or replacement, which creates costs in terms of materials, labor, and downtime. Thermal stresses also reduce the service life of the underlying materials. Further, the vanes and seals require a flow of cooling fluid. This requires energy and creates more opportunities for heat related component damage and associated costs.

Vanes are produced in segments and then assembled together to form a ring. This requires additional seals between the vane components, through which there may be more cold air leakage into the hot gas path. Further, these configurations usually require assembly of the components directly onto the engine in confined areas of the engine, which is time consuming and difficult.

BRIEF DESCRIPTION OF THE DRAWINGS

The invention is explained in the following description in view of the drawings that show.

DETAILED DESCRIPTION OF THE INVENTION

Figure 1:
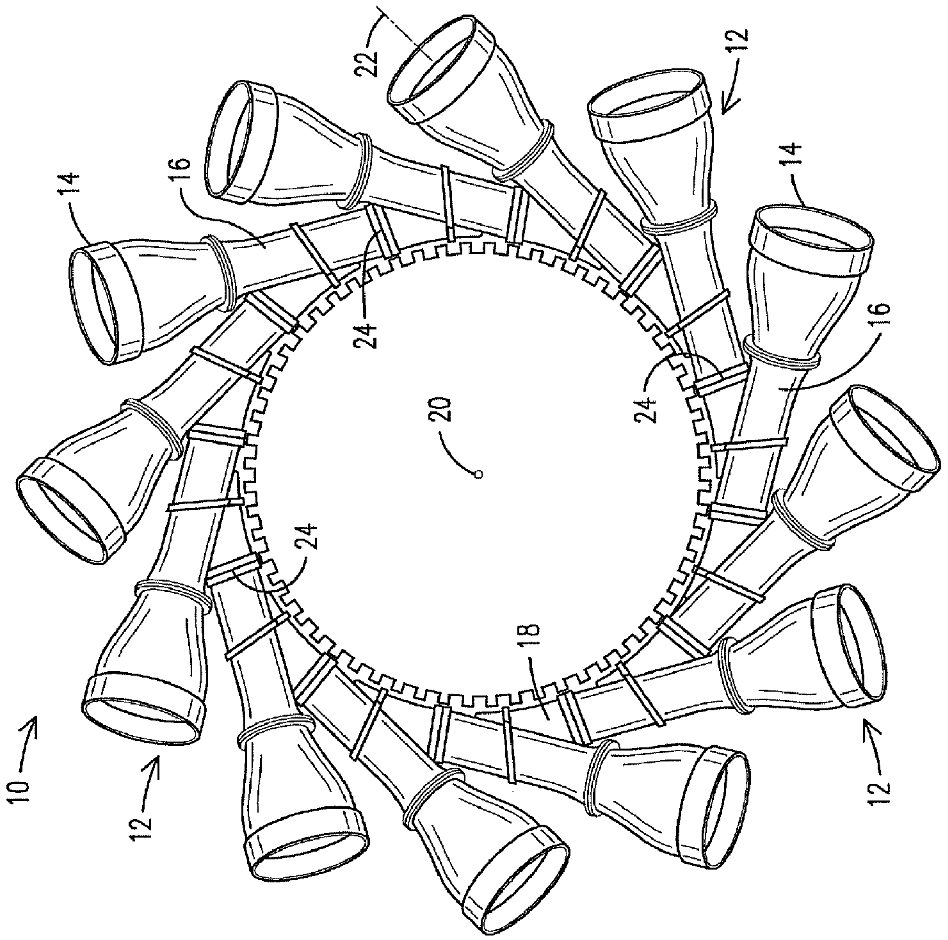
FIG. 1 shows a top view of an assembled arrangement 10.

The inventors of the present system have designed an innovative arrangement, made of multiple, modular, interchangeable, flow directing assemblies. One such assembly is identified by the trademark NOVA-Duct™ by the assignee of the present invention. The combustor cans of the gas turbine combustor have been reoriented to permit the use of an assembly of components that direct individual gas flows from the combustor cans of a can annular combustor of a gas turbine combustion engine into a singular annular chamber immediately upstream and adjacent the first row of turbine blades. The inventors of the present system observed that prior configurations for delivering flows of can-annular combustors to the first row of turbine blades kept each flow separate and distinct from the other flows all the way to the first row of turbine blades. As a result, between each flow about to contact the first row of turbine blades there is a gap, or trailing edge, where there is reduced flow delivered to the blades. These trailing edges, which vary in magnitude from design to design, create flow disturbances and associated energy losses. Consequently, as the first row blades rotate, they alternately see regions of a high volume of very hot flow, and cooler regions of reduced flow. The blades thus experience rapidly changing temperatures and aerodynamic loads as they rotate through these regions, and these oscillations shorten blade life. The assembly eliminates walls between adjacent flows in the annular chamber. Eliminating the walls between adjacent flows eliminates trailing edges associated with the walls, and the accompanying energy losses.

A recent design innovation, as disclosed in commonly assigned U.S. Pat. No. (7,721,547) to Bancalari et. al., incorporated by reference herein, replaces the conventional transition, seals, and vanes with an assembly of one piece transition ducts that transport expanded gasses from the combustion chamber directly to the first row of turbine blades, while simultaneously orienting the gas flow to properly interface with the first row of turbine blades. This orienting is achieved by curving and shaping each duct, and consequently each respective gas flow, along its length. By using fewer seals, aerodynamic losses due to seals are reduced, as are flow losses through the seals. The newer design uses the entire length of the duct to properly orient the flow, while the designs of the prior art used vanes at the end of the duct to orient the flow, which resulted in a relatively abrupt change in the flow direction, and associated energy losses. Further, this newer design reduces costs associated with manufacturing, assembly and maintenance.

Another recent design innovation, as disclosed in pending and commonly assigned U.S. patent application Ser. No. 12/190,060 to Charron filed on Aug. 12, 2008, and incorporated herein by reference, orients the combustor cans of the gas turbine combustor to permit the use of an assembly of components that form a straight path between each combustor can and a respective circumferential portion of the first row of turbine blades. In the Charron configuration, gasses flowing from each combustor can flow along an individual straight path, without mixing with any other flows, exit the assembly, and flow into the first row of turbine blades. As a result of these straight paths, there are fewer aerodynamic energy losses, and thus a greater amount of energy is delivered to the first row of turbine blades. The current arrangement improves upon the ideas presented in the incorporated documents.

The arrangement comprises multiple sets of flow directing structures, one for each combustor. Each flow directing structure may include a cone and an associated integrated end piece ("IEP"). A combustor in a conventional gas turbine engine may be oriented radially inward and axially downstream with respect to a gas turbine engine longitudinal axis. However the combustions cans in a gas turbine engine that uses the present arrangement may be oriented circumferentially and downstream with respect to the gas turbine engine longitudinal axis.

Combustion gas exits the combustor along a straight gas flow path longitudinal axis and is constrained discretely from other combustion gas flows emanating from other combustor cans until all gas flows reach a common annular chamber. Once in the annular chamber the gas flows may deviate from respective straight gas flow longitudinal axis, and the gas flows are no longer separated by structural walls. The gas flows then exit the annular chamber through the annular chamber outlet. The annular chamber outlet comprises a plane perpendicular to a downstream end of the annular chamber, where the gas enters the turbine first stage section.

Upon exiting the combustor, a cone directs gasses from the combustor can to the IEP. It is possible, however, that a cone not be used and the can itself discharge into an IEP. The associated IEP receives a gas flow from the cone and ultimately delivers the gas to the blades of a turbine first stage blade section. The IEP may deliver a portion of, or all of the gas flow it receives from the combustor to an adjacent and downstream IEP. The adjacent and downstream IEP may deliver a portion of the gas flow it receives from the IEP to the annular chamber outlet. It may also deliver a portion of the flow it receives from the IEP to another IEP further downstream from it, which may in turn deliver some or all of the gas flow to the annular chamber outlet. A gas flow that enters an IEP may flow through a total of two, three, or more IEPs before making its way entirely through the annular chamber.

How many IEPs a gas flow traverses between exiting a cone and fully exiting an annular chamber outlet depends in part on the angle between a combustor longitudinal axis and a plane perpendicular to the gas turbine longitudinal axis. The angle between the combustor longitudinal axis and the plane perpendicular to the gas turbine longitudinal axis may be influenced by the number of combustor cans present in the gas turbine engine. A smaller angle means the combustor is oriented more circumferentially with respect to the gas turbine longitudinal axis, and a larger angle means the combustor is oriented more axially with respect to the gas turbine longitudinal axis. A shallower angle will require more circumferential travel for every unit of distance traveled along the gas turbine longitudinal axis. Conversely, a larger angle will require less circumferential travel for every unit of distance traveled along the gas turbine longitudinal axis. A gas flow path through an annular chamber that requires more circumferential travel will necessarily span more IEPs than a gas flow through an annular chamber that requires less circumferential travel. An axial length of the annular chamber will also determine how many IEPs a gas flow will traverse before entirely exiting the annular chamber outlet and entering the turbine first stage blade section. In an embodiment, fillets resulting from transitions of flow defining walls can be tapered in a downstream direction to reduce a runout length of the fillet. This allows for an annular chamber 18 of a shorter axial length.

A stage of a conventional gas turbine engine may include a small length of space upstream of vanes, the vanes themselves, a gap between the vanes and blades, the blades themselves, and a length of space downstream of the blades. However, since the present arrangement eliminates the need for vanes, the first stage section of a gas turbine engine using the present arrangement does not include the vanes, but is instead and will be considered herein a small length of space upstream of the blades, the blades themselves, and a length of space downstream of the blades.

A perimeter of each gas flow exiting from a combustor can is fully bounded by structural walls of the flow directing structure. The gas flows exiting the annular chamber outlet are not separated from each other by structural walls, but are instead only partially bounded to keep them flowing within the walls of the annular chamber. Consequently, at some point between exiting the combustor and exiting the annular chamber outlet the flow must be transitioned from having a completely bounded perimeter to having only a partially bounded perimeter.

Furthermore, conventional combustor cans have a circular cross section, but configuring gas flows to abut but not intersect adjacent gas flows while entering the annular chamber and producing a single, annular flow to the first row of blades necessitates gas flows with non-circular cross sections. Consequently, the gas flow must be morphed from a gas flow with a circular cross sectional shape to a gas flow with a non-circular cross sectional shape as it travels along the overall gas flow longitudinal axis.

In addition, once adjacent gas flow paths actually abut, it is preferred that there be no wall to separate the gas flow paths. As a result, it is important that each flow be properly oriented so that no gas flow path intersects or overlaps another gas flow path. Each gas flow path must also be formed such that it comprises a collimated flow (i.e. non diverging or converging, where all molecules of the gas are flowing parallel to each other and to the longitudinal axis of the gas flow path, but may be flowing at different speeds) so that once a gas flow path's perimeter is not fully bounded by walls the gas flows do not diverge into adjacent gas flows. Such divergence would result in loss of aerodynamic efficiency. Even more ideal would be a flow comprising a uniform flow profile, where all molecules of the gas are flowing parallel to each other and to the longitudinal axis of the gas flow path, and where all the molecules are flowing at the same speed.

It is the innovative design of the IEP disclosed herein that permits it to: transition the gas flow from a fully bounded perimeter to a partially bounded perimeter; morph the flow from a circular cross section to a non-circular cross section; properly orient each gas flow so that no gas flow paths intersect or overlap; and generate a collimated flow within the gas flow prior to transitioning it to a partially bounded gas flow.

As used herein, a gas flow path refers to a gas flow path defined by walls when walls are present, and where walls are not present, the boundary of the gas flow path is defined by the plane created by a downstream projection of the wall where it exists upstream. In other words, if a wall ends at some point along the gas flow path, the boundary of the gas flow path is considered to be an extension of that wall. The IEP attempts to define gas flow paths such that when gas flows are not physically separated from each other they will not, in theory, mix. However, fluid dynamics, particularly in such a dynamic environment as a working gas turbine engine, make it essentially impossible to ascertain exactly what actual flow path a gas flow will actually take once partially unbounded. For example, perturbations in the gas flow downstream of the annular chamber may impart transient changes to the actual path the gas flow takes while flowing through the IEP. Furthermore, the interaction of the gas flows with each other and with walls in the IEP may cause the gas flows to flow in a manner other than through the path defined for it by the structure. In addition, changes in load levels in the gas turbine as well as atmospheric conditions etc. may influence the actual gas path the gas takes through the IEP. Hence, the disclosure focuses on the gas path as defined by the structure, not by the actual gas path the gas takes while in the IEP.

As best understood by the inventors, but not meant to be limiting in theory, gas flows entering the annular chamber adjust volume as necessary to fill the entire volume of the annular chamber, the annular flow exiting the annular chamber is a single annular flow, and a circumferential motion is imparted to some degree to every part of the single annular flow exiting the annular chamber outlet. It is believed that the single annular flow may not be uniform in nature, but it is more uniform than a plurality of discrete flows with walls there between. This uniformity increases aerodynamic efficiency and reduces the range of oscillatory mechanical loads on the blades. Furthermore, with a substantially straight gas flow path from the combustor to the annular chamber, aerodynamic losses resulting from excessive gas flow redirection are reduced, increasing engine efficiency.

Turning to the drawings, FIG. 1 shows a top view of the arrangement 10. As referred to herein, a top view means looking from upstream toward downstream along the gas turbine engine longitudinal axis, and bottom view means the opposite. When speaking of flows, top refers to an upstream side, and bottom refers to a downstream side with respect to the longitudinal axis of the gas turbine engine. Inner and outer refer to radial positions with respect to the gas turbine engine longitudinal axis. Adjacent refers to items circumferentially adjacent with respect to the gas turbine longitudinal axis. In the disclosed embodiment the gas turbine engine rotates clockwise when looking from a top view, i.e. when looking from upstream to downstream with respect to the gas turbine longitudinal axis. However, the entire disclosure is also considered to encompass gas turbine engines that rotate counter clockwise when looking downstream, and only the components would simply be reoriented. Upstream adjacent in this embodiment means upstream with respect to the direction of rotation of the gas turbine engine, and adjacent means circumferentially adjacent. Downstream adjacent means downstream with respect to the direction of rotation of the gas turbine engine and circumferentially adjacent. Thus, during rotation a blade would encounter an upstream component of the assembled arrangement before encountering a downstream component.

The arrangement 10 is composed of multiple sets of flow directing structures 12. There is a flow directing structure 12 for each combustor (not shown). The combustion gasses from each combustor flow into a respective flow directing structure 12. Each flow directing structure includes a cone section 14 and an IEP 16. The IEPs 16 together form an annular chamber 18. Each gas flow enters the annular chamber 18 at discrete intervals circumferentially at an orientation that includes a circumferential component and an axial component with respect to the gas turbine engine longitudinal axis 20. Each gas flow originates in its respective combustor can and is directed as a discrete flow to the annular chamber 18. When discrete, each flow is separated by walls, but in the annular chamber 18 the flows are not separated by walls. The flows are still constrained to the annular chamber 18, but they are not separated from each other. Each IEP 16 abuts adjacent annular chamber ends at IEP joints 24.

Immediately downstream of the annular chamber 18 is the first row of turbine blades (not shown). In conventional can annular gas turbine combustion engines each flow is discrete until it leaves a transition immediately upstream of the first stage which, in the conventional gas turbine engine includes flow directing vanes and then a row of blades. The transitions keep the flows discrete until just before encountering flow directing vanes. The flow directing vanes may further divide the discrete flows prior to each flow reaching the blades. As such, the blades see varying amounts of combustions gasses as they rotate through the divided flows. The annular chamber 18 eliminates any walls that separate the flows, and also eliminates the first row of flow directing vanes that divide the flows. As a result, the flows are not divided, but rather are essentially a single, annular flow immediately prior to entering the first row of turbine blades. Each gas flow path enters the annular chamber 18 along an overall gas flow longitudinal axis 22. Once in the annular chamber 18 the walls that defined the top and bottom of each flow upstream cease to do so. In addition, the walls that define the inner and outer sides of the flow transition from straight walls to arcuate walls that partially define the annular chamber 18. As the gas flow path continues circumferentially through the annular chamber it simultaneously advances along the gas turbine longitudinal axis. As a result, the bottom of the gas flow path first reaches the annular chamber outlet (not shown) and at a circumferentially downstream location the top of the gas flow path then reaches the annular chamber outlet.

Conventional can combustors comprise a circular cross section, as does the combustion gas flow emanating from it. Were the discrete flows to remain circular as they entered the annular chamber the rotating blades would encounter arched oval arcs with hour-glass shaped areas devoid of combustion gas flow there between, and thus the blades would still encounter a significant range of mechanical loads as they rotate. Overlapping the circumferential ends of adjacent circular cross section flows would induce aerodynamic inefficiency in the flows and is therefore less preferable. In order to present an annular flow path a non-circular cross section for the gas flow path was chosen such that when combined in an annular chamber 18, they could unite into an annular flow with a cross section where it is believed every portion contains combustion gasses. Such a cross section is more uniform and thus the blades see a more uniform gas flow as they rotate. This in turn reduces the range of mechanical loads on the blades, thereby increasing their service life. The geometry required to do this, however, is somewhat complex.

Figure 2:
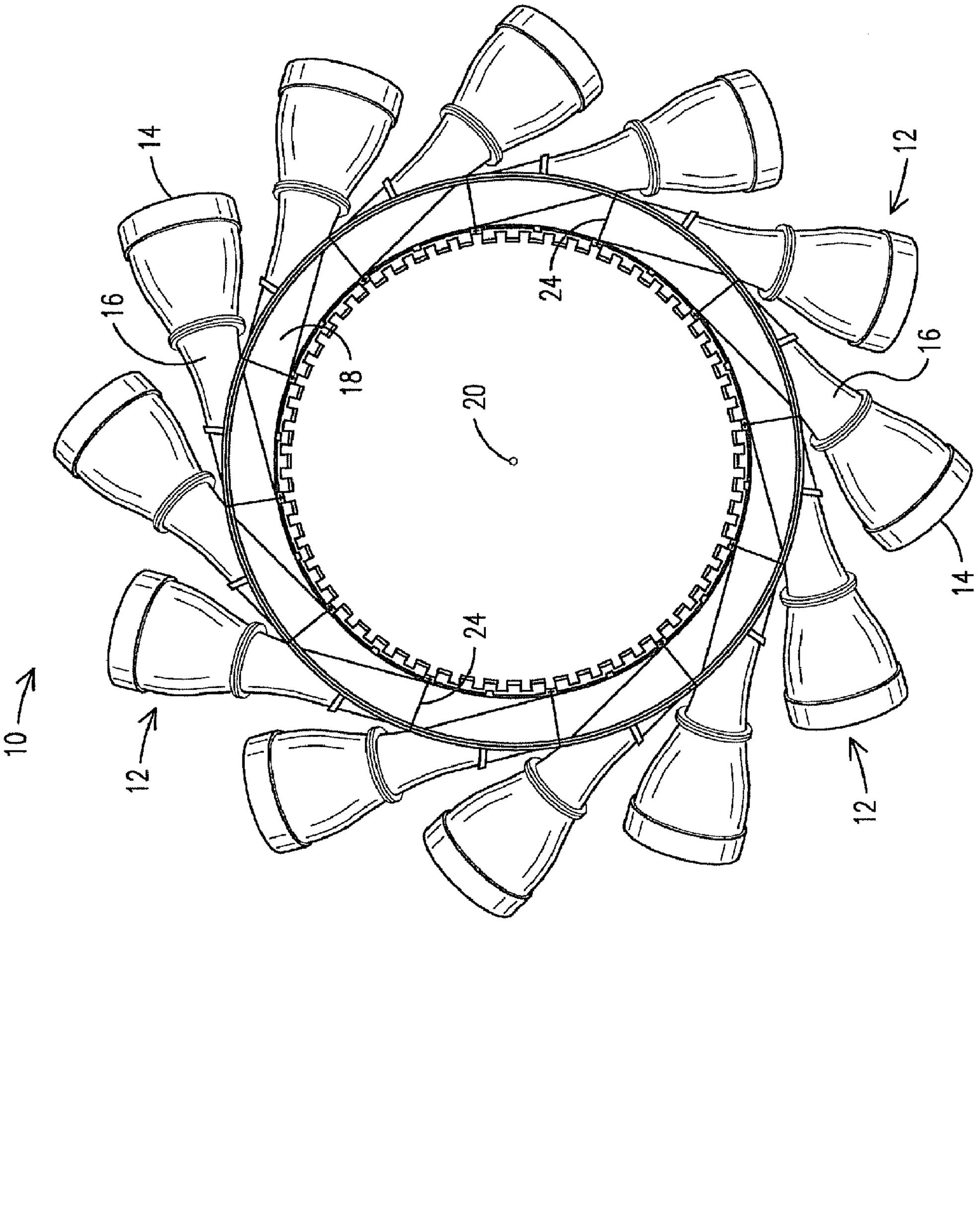
FIG. 2 is a bottom view of the arrangement 10 of FIG. 1.

FIG. 2 is a bottom view of the arrangement 10. The annular chamber 18 is visible here, and an annular chamber outlet is a plane at a downstream of the annular chamber 18 where the annular chamber ends. Some of the flow defining surfaces can be seen inside the annular chamber 18 toward an upstream end.

Figure 3:
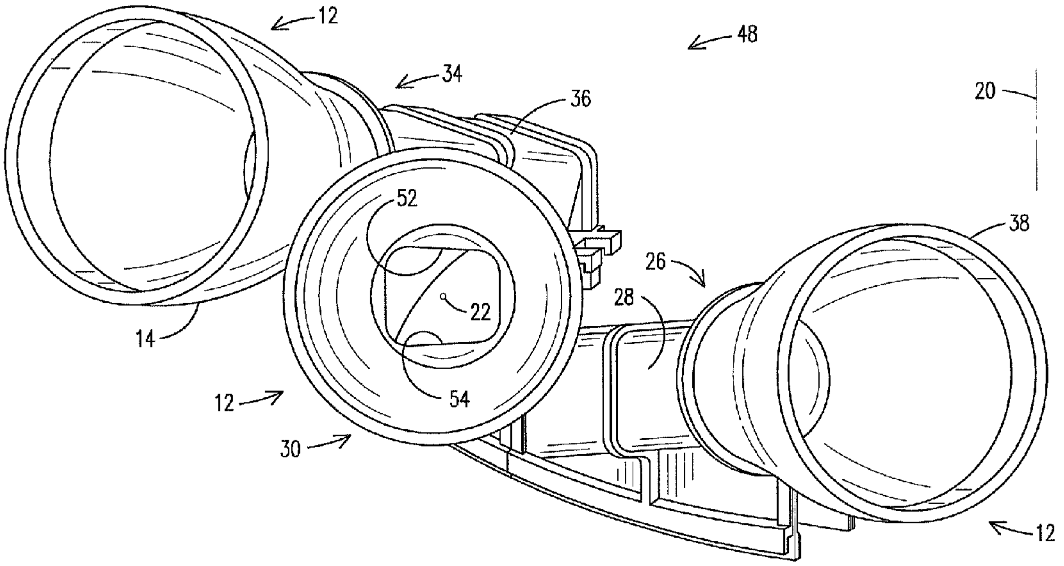
FIG. 3 is a view looking downstream along an overall gas flow path longitudinal axis.

FIG. 3 is a view looking downstream along an overall gas flow path longitudinal axis 22, i.e. the view as seen from a combustor. Visible are the overall gas flow path top boundary 52 and an overall gas flow path bottom boundary 54. It can be seen that these boundaries are not parallel, but instead are angled toward each other on a radially inward side. This geometry is necessary so that each of the gas flow outlets can be positioned radially about a common point on the gas turbine engine longitudinal axis 20 and also each has a directional component along the gas turbine engine longitudinal axis 20.

Each flow directing structure 12 defines part of each overall gas flow path; it does not define the overall gas flow path a particular combustor's gas flow takes through the arrangement 10. In an embodiment, but not meant to be limiting, the overall gas flow path actually spans three flow directing structures 12 before entirely exiting the annular chamber 18. This can be seen in FIG. 4, which is a partial arrangement 48 of the arrangement 10, showing three flow directing structures 12 as viewed from radially outward looking radially inward. There is what is termed an associated flow directing structure 26 comprising an associated IEP 28; there is a downstream adjacent flow directing structure 30 comprising a downstream adjacent IEP 32; and there is a further downstream flow directing structure 34 comprising a further downstream IEP 36. The overall gas flow path begins at a cone upstream end 38, travels through an associated IEP first flow path 40, then through a downstream adjacent IEP second flow path 42, and finally through a further downstream adjacent IEP third flow path 44. It can be seen that the overall gas flow path bottom boundary traverses the annular chamber outlet 46 at some point along the downstream adjacent IEP second flow path 42, at a point after traversing the junction 24 between the associated IEP 28 and the downstream IEP 32. As the overall gas flow path advances circumferentially about the gas turbine engine longitudinal axis 20 it also advances axially along the gas turbine engine longitudinal axis 20 such that at a point in the further downstream adjacent IEP third flow path 44 the overall gas flow top boundary 52 exits the annular chamber outlet 46.

Figure 4:
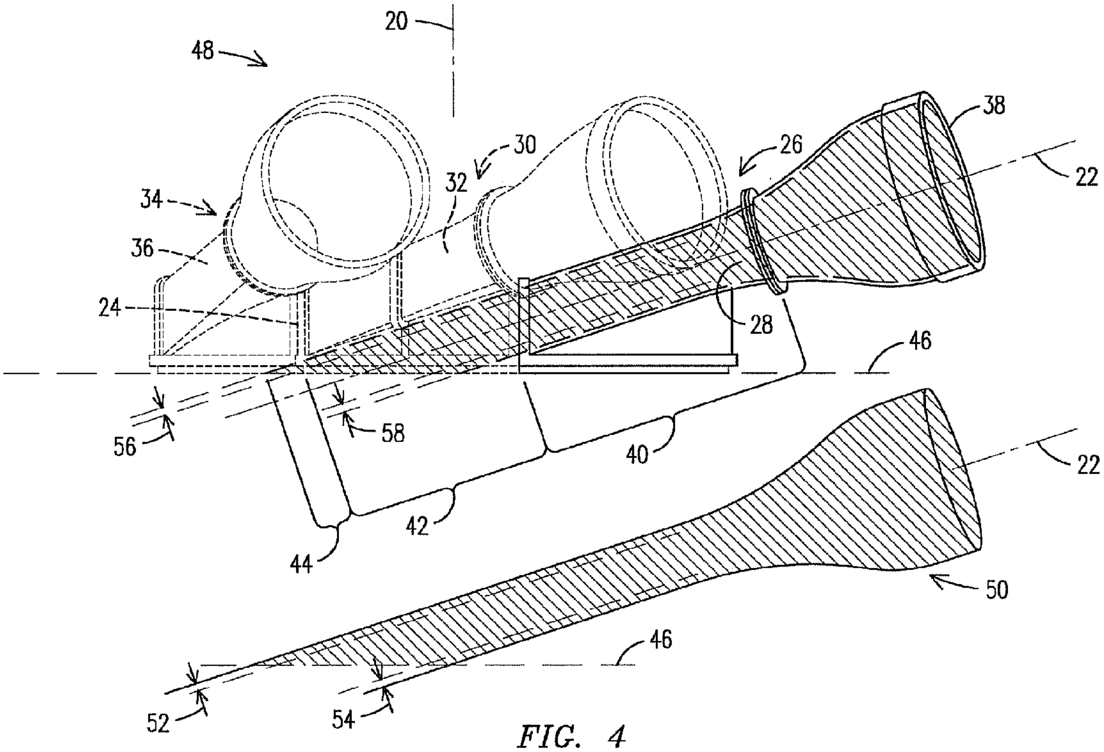
FIG. 4 is an outside side-view of a partial arrangement of the arrangement of FIG. 1.

A side view of the overall gas flow path 50 delineated by the structures but without the structures blocking the view is shown in FIG. 4 partial arrangement 48 of the arrangement 10. It can be seen in this view that the gas flow path longitudinal axis 22 remains straight in the associated IEP first flow path 40 and into the downstream adjacent IEP second flow path 42. Also visible are the overall gas flow top boundary 52 and the overall gas flow bottom boundary 54. The overall gas flow top boundary 52 forms an overall gas flow top boundary plane 56 throughout its length. Similarly, the overall gas flow bottom boundary 54 forms an overall gas flow bottom boundary plane 58 throughout its length. Each of these planes is parallel to the overall gas flow path longitudinal axis 22 when it is straight, but as was visible in FIG. 3, the overall gas flow top boundary plane 56 angles toward the overall gas flow bottom boundary plane 58 on a radially inner end, as indicated by the dotted lines. The overall gas flow path longitudinal axis 22 does not remain straight once the overall gas flow path 50 reaches an arcuate wall, but the overall gas flow top boundary 52 remains within the overall gas flow top boundary plane 56 throughout the length of the overall gas flow path 50. Similarly, the overall gas flow bottom boundary 54 remains within the overall gas flow bottom boundary plane 58 throughout the length of the overall gas flow path 50.

Figure 5:
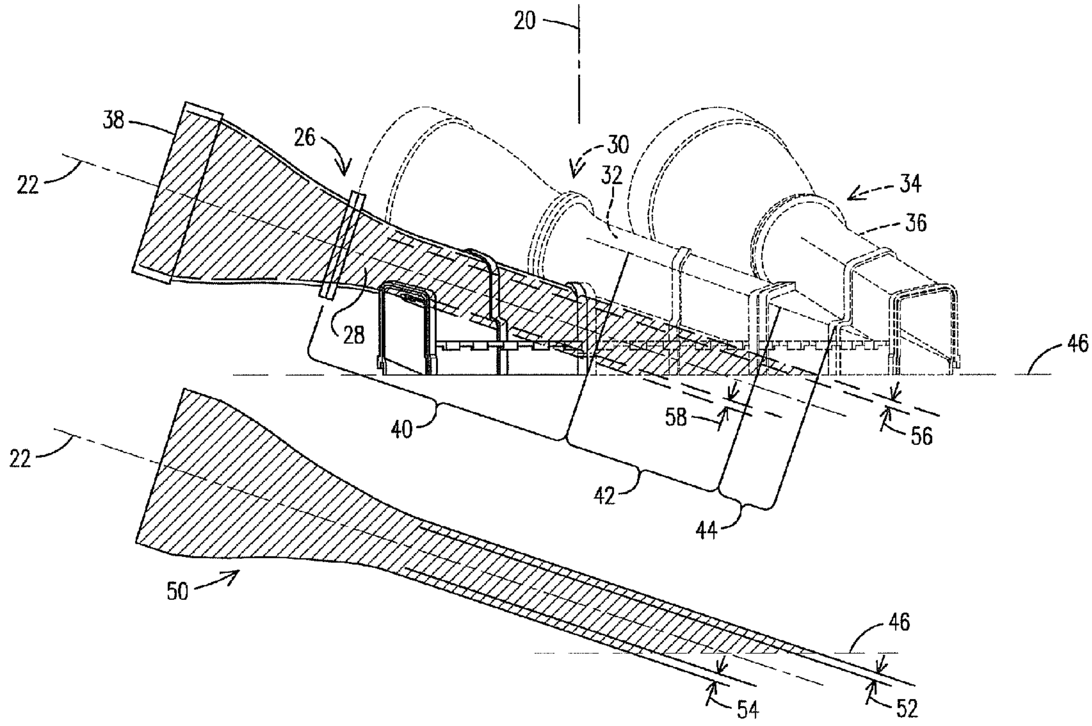
FIG. 5 is an inside side-view of the partial arrangement of FIG. 4.

For sake of clarity, FIG. 5 is the partial arrangement 48 of the arrangement 10 of FIG. 4, showing three flow directing structures 12 as viewed from the opposite side, now looking radially inward to radially outward. The same elements are visible in this view that are visible in FIG. 4.

Figure 6:
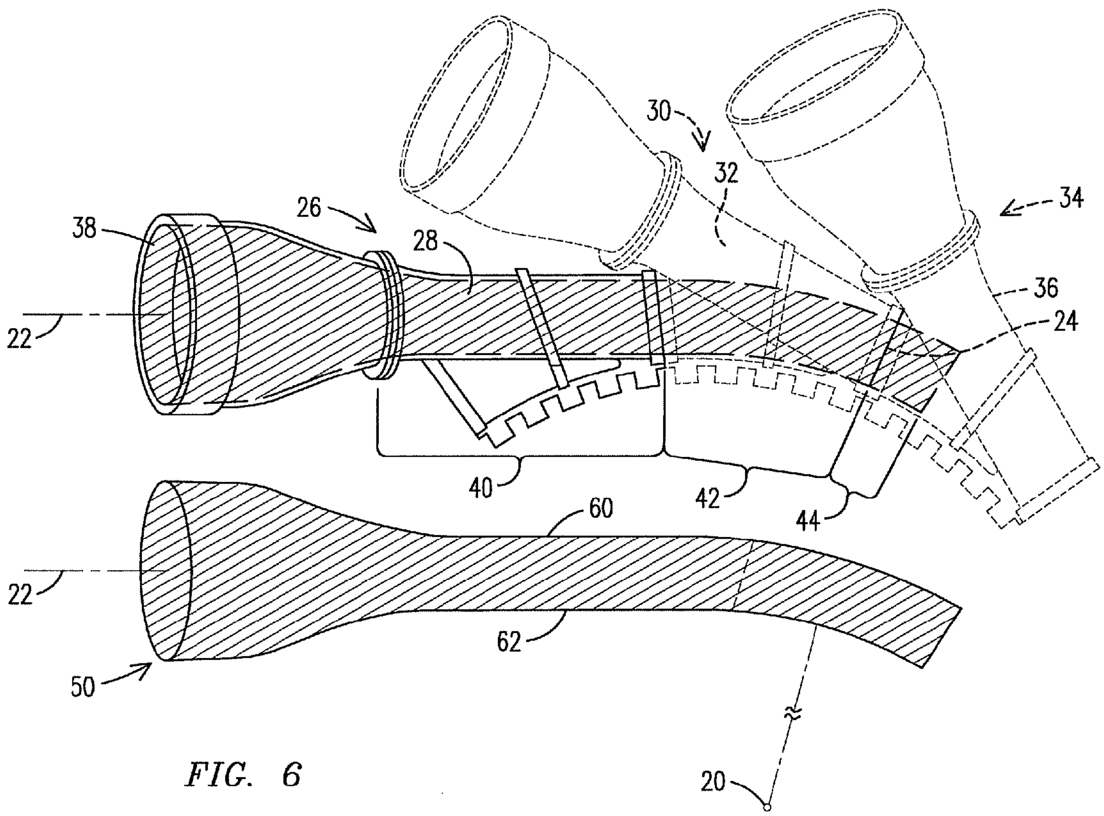
FIG. 6 is a top view of the partial arrangement of FIG. 4.

FIG. 6 is the partial arrangement 48 of the arrangement 10 of FIG. 4, showing three flow directing structures 12 as viewed from the top. All of the same elements are visible as were in FIG. 4, but it is apparent that when viewed from the top the overall gas flow path 50 does not remain straight throughout its entire length. Similarly, the overall gas flow path outside boundary 60 transitions from straight to arcuate as does the overall gas flow path inner boundary 62. It can be seen that the overall gas flow path outside boundary 60 and the overall gas flow path inner boundary 62 also serve as a portion of the annular chamber 18.

Figure 7:
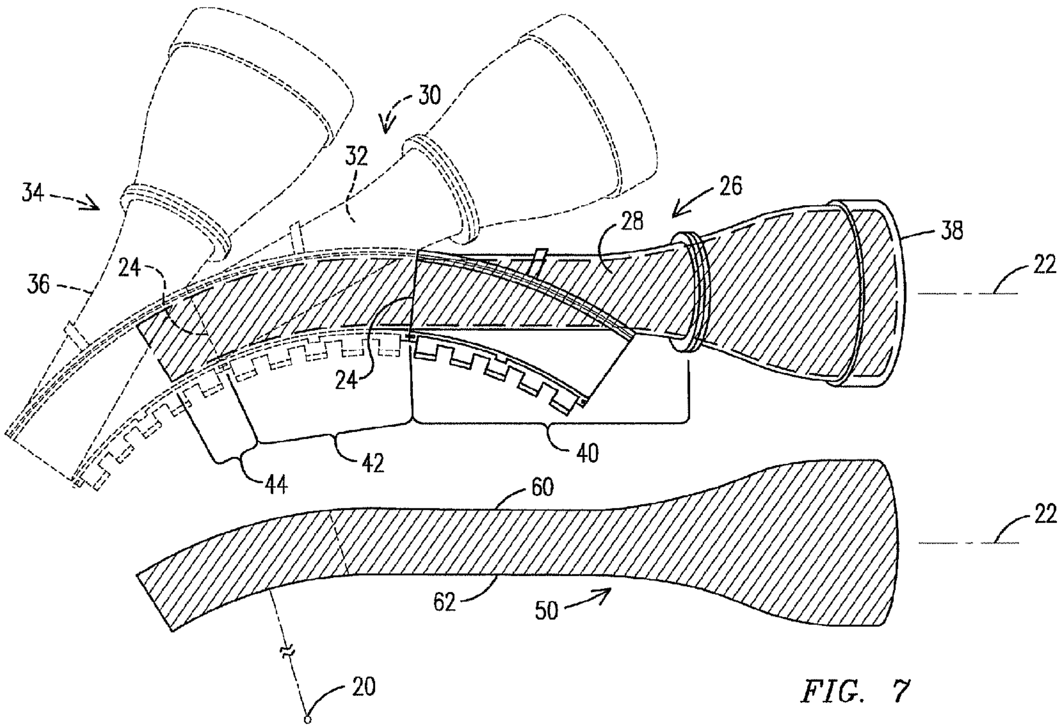
FIG. 7 is a bottom view of the partial arrangement of FIG. 4.

For sake of clarity, FIG. 7 is the partial arrangement 48 of the arrangement 10 of FIG. 4, showing three flow directing structures 12 as viewed from the bottom. The same elements are visible in this view as were visible in FIG. 6.

Figure 8:
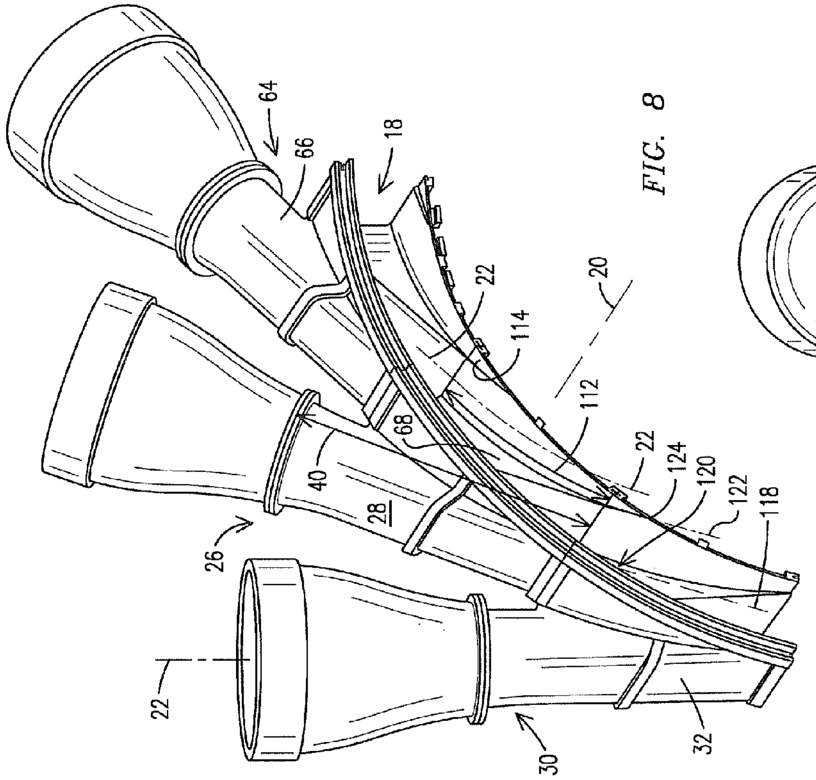
FIG. 8 shows the partial arrangement of FIG. 4.

FIG. 8 is the is the partial arrangement 48 of the arrangement 10 of FIG. 4, showing three flow directing structures 12 as viewed from radially outward looking inward and upstream. Shown are the associated flow directing structure 26 comprising an associated IEP 28 and the downstream adjacent flow directing structure 30 comprising a downstream adjacent IEP 32 discussed before. Also shown is an upstream flow directing structure 64 comprising an upstream IEP 66. All the walls inside the annular chamber 18 are various flow directing walls. The view of FIG. 8 is particularly useful to illustrate how an overall gas flow path 50 advances along the gas turbine engine longitudinal axis 20 as it also advances along the overall gas flow path longitudinal axis 22. Adjacent overall gas flow paths within a single IEP are geometrically discrete, i.e. they are configured such that a flow that does not diverge when partially unbounded can flow through the IEP without intersecting or overlapping an adjacent gas flow. While this may not actually occur when the gas turbine engine is running, the paths are configured to produce that result in a theoretical, collimated gas flow.

In and embodiment the IEP second flow path 112 is also used to transition the overall gas flow path 50 from being straight as it enters the IEP second flow path 112 to an overall gas flow path 50 that will be helical after traversing the annular chamber outlet 46. (The entire overall gas flow 50 may or may not exit the annular chamber outlet 46 while in the IEP 16 where it transitions from straight to non straight.) While the overall gas flow longitudinal axis 22 may itself transition from straight to helical at some point in the IEP second flow path 112, the overall gas flow path 50 is still bounded on the top by the overall gas flow top boundary plane 56, and on the bottom by the overall gas flow bottom boundary plane 58 from entering into the IEP second flow path 112 until exiting the annular chamber outlet 46. Since a helix is a curve, and the top and bottom boundaries are defined by planes when within the annular chamber, the top and bottom of the overall gas flow path 50 cannot be helixes when within the annular chamber. In fact, because the overall gas flow top boundary plane 56 and the overall gas flow bottom boundary plane 58 are not parallel, but instead converge on a radially inner side in an embodiment, and because the annular chamber curves radially inward so to speak, the overall gas flow top boundary plane 56 and the overall gas flow bottom boundary plane 58 would actually meet at a point in the annular chamber sufficiently downstream, were the annular chamber 18 lengthened along the gas turbine engine longitudinal axis 20. This would effectively end the theoretical overall gas flow path 50 and the combustion gasses would have no choice but to breach the boundaries of the overall gas flow path 50, which would defeat the purpose of having discrete flow paths. As a result, the overall gas flow path 50 is transitioned from having planar top and bottom boundaries to having helical top and bottom boundaries, and this transition begins in the IEP second flow path 112. Helical top and bottom boundaries will enable the theoretically discrete gas flow paths to remain discrete once transitioned to the annular chamber 18, thus reducing mixing of adjacent flows.

The overall gas flow top boundary 52 in the IEP second flow path 112 transitions from straight to curved while still remaining within the overall gas flow top boundary plane 56. The intersection of the overall gas flow top boundary 52 with the annular chamber outlet 46 defines the theoretical helical top boundary of that flow downstream from the intersection. That helical top boundary would be defined by a helical top boundary outer edge helix and a helical top boundary inner edge helix. The helical top boundary outer edge helix is defined by an outer tangent 118 of an overall gas flow top boundary outer edge at an outer tangent intersection point 120 with the plane of the annular chamber outlet 46. The helical top boundary inner edge helix is defined by an inner tangent 122 of an overall gas flow top boundary inner edge at an inner tangent intersection point 124 with the plane of the annular chamber outlet 46. The helical top boundary would be a helical plane between the helical top boundary outer edge helix and the helical top boundary inner edge helix. The same geometry applies to the overall gas flow bottom boundary 54 and a resultantly formed helical bottom boundary, since the overall gas flow top boundary 52 is the bottom of an upstream adjacent flow etc. The overall gas flow bottom boundary 54 transitions to helical earlier along the overall gas flow path longitudinal axis 22 than does the overall gas flow top boundary 52. The overall gas flow path longitudinal axis 22 transitions to helical at some point in between when the overall gas flow bottom boundary 54 transitions to helical and when the overall gas flow top boundary 52 transitions to helical.

It is also worth noting that it does not matter if an overall gas flow top boundary 52 traverses the annular chamber outlet 46 in the IEP second flow path 112 it entered, or a downstream IEP. The theory of the transition is the same for different configurations, the geometry will simply adapt to a shallower or steeper overall gas flow path 50 with respect to the gas turbine longitudinal axis 20. Furthermore, it is also worth noting that in another embodiment, transitioning the overall gas flow path 50 from being straight may begin to occur in the IEP first flow path 40. In such instances the transition of the overall gas flow path from straight is governed by the same principles, but the transition simply begins at some point in the IEP first flow path. For example, the overall gas flow path 50 is still bounded on the top by the overall gas flow top boundary plane 56, and on the bottom by the overall gas flow bottom boundary plane 58 from entering into the IEP second flow path 112 until exiting the annular chamber outlet 46. Whether the transition occurs in the IEP second flow path 112 or the IEP first flow path 40 is a matter of design choice, and may be driven in part by the number of combustors, or the angle between the combustor longitudinal axis and the plane perpendicular to the gas turbine longitudinal axis.

Figure 9:
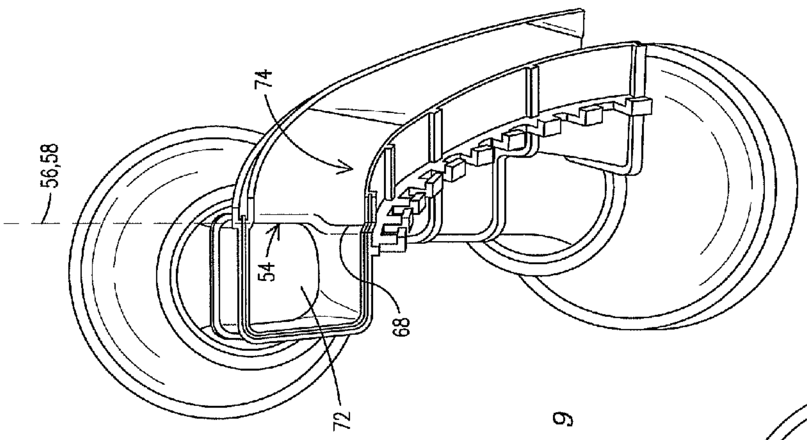
FIG. 9 is a view of two flow directing structures showing a common plane.

In order that adjacent overall gas flow paths not intersect or overlap each must be properly oriented when with respect to the adjacent upstream overall gas flow path and the adjacent downstream overall gas flow path. The geometry in an embodiment permits an overall gas flow to have a portion with a non-circular cross section, where the overall gas flow top boundary plane 56 and overall gas flow bottom boundary plane 58 are planar. As a result, as can be seen in FIG. 9, an upstream adjacent overall gas flow top boundary 68 defines an overall gas flow top boundary plane 56, an overall gas flow bottom boundary 54 defines an overall gas flow bottom boundary plane 58, and those planes are common to each other, i.e. they are the same plane. As a result of this, a first overall gas flow path 72 in an IEP and a second, adjacent overall gas flow path 74 in that same IEP share a common boundary. Assuming collimated flow for both flows in that IEP in both the bounded portion and the partially unbounded portions of that IEP, then the flows should not intersect, overlap, or diverge into each other. As a result aerodynamic losses associated with intersecting or overlapping flows, or flows that diverge into each other, are reduced.

Also visible in FIG. 9 is one embodiment of how a gas flow path may be transitioned from having a circular cross section to having a non-circular cross section. In this embodiment, where a cross section is fully circular at an upstream end and has flat sides on a downstream end, a fillet can be used to transition the cross section from one non-circular portion to another non-circular portion. More specifically, a first flat portion of the cross section (e.g. a first wall of the gas flow path) and a second flat portion of the cross section (e.g. a second wall of the gas flow path) may be joined with a fillet. At the upstream end, where the flat surfaces first begin to appear, the fillet may have a radius close to or the same as the circular portion of the gas flow path. As the cross section of the gas flow path becomes less circular, the radius of the fillet may decrease. In other words, as a first wall and a second wall “grow” in a cross section of the gas flow path in a downstream direction, the fillet decreases, (i.e. a radius of the fillet decreases). In an embodiment, the non-circular portion of the gas flow path may ultimately end up with only flat walls, and in such a case the radius of the fillet between adjacent walls would have been reduced to zero. In other embodiments the radius may be reduced to a low value, but not necessarily a zero value. Such tapering fillets provide advantages. For example, such a configuration allows for a smooth transition from a gas flow path with a circular cross section to a gas flow path with a non-circular cross section and, as will be discussed below, allows for control of properties of the gas flow. Further, having a smaller fillet at the downstream-most end of the gas flow path allows for a more uniform annular flow at the exit plane. In contrast, large fillets would produce notches (Le. non uniformities) along the outer and inner edges of the annular flow at the outlet plane. Also, at the upstream-most point where adjacent flows meet, a portion of the geometry between adjacent fillets in adjacent flows may remain undefined despite each gas flow path conforming to its own geometric requirements. In other words, a portion of the area between such fillets may be formed in any number of ways because that portion does not define either gas flow path. However, that portion may influence gas flowing within a gas flow path. Thus, minimizing the size of that portion by reducing the radius of the fillet increases control of the gas flow and reduces variation in flows from one geometry in that portion to another geometry in that portion. This, in turn, allows for more consistent modeling and performance from one arrangement 10 to the next.

Figure 10:
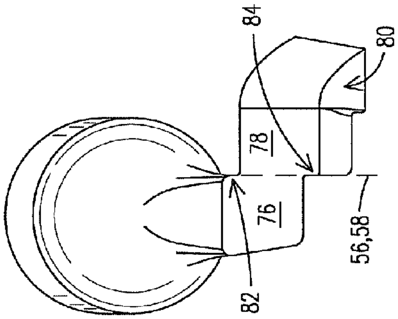
FIG. 10 diagrammatically shows a model of three adjacent gas flows within a single integrated exit piece.

FIG. 10 diagrammatically shows a model of three adjacent gas flows within a single IEP, with the structure of the IEP removed for clarity. The first gas flow 76 is present in the IEP first flow path 40 (not visible because the structure is removed). The second gas flow 78 is present in the IEP second flow path 112 (similarly not visible). The third gas flow 80 is present in the IEP third flow path 114 (similarly not visible). It can be seen that a first gas flow bottom side 82 is coplanar with a second gas flow top side 84, which produces abutting overall gas flow path boundaries that share a common plane. The same principle extends to the boundary between the second gas flow 78 and the third gas flow 80 within that IEP, meaning that the second gas flow 78 and the third gas flow 80 are also configured so they do not intersect, overlap, or diverge into each other. (It can be seen in the embodiment for which the air flows here are derived that the IEP third flow path 114 extends almost all the way through the IEP.) This happens because, as disclosed above, the top and bottoms of boundaries of all the gas flows are planes, and as disclosed here, the respective planes are aligned to be common to each other. A theoretical, non-diverging gas would not diverge past the plane that defined a boundary, and as a result, adjacent theoretical gas flows would not diverge into each other once their flow paths were defined as described above.

Figure 11:
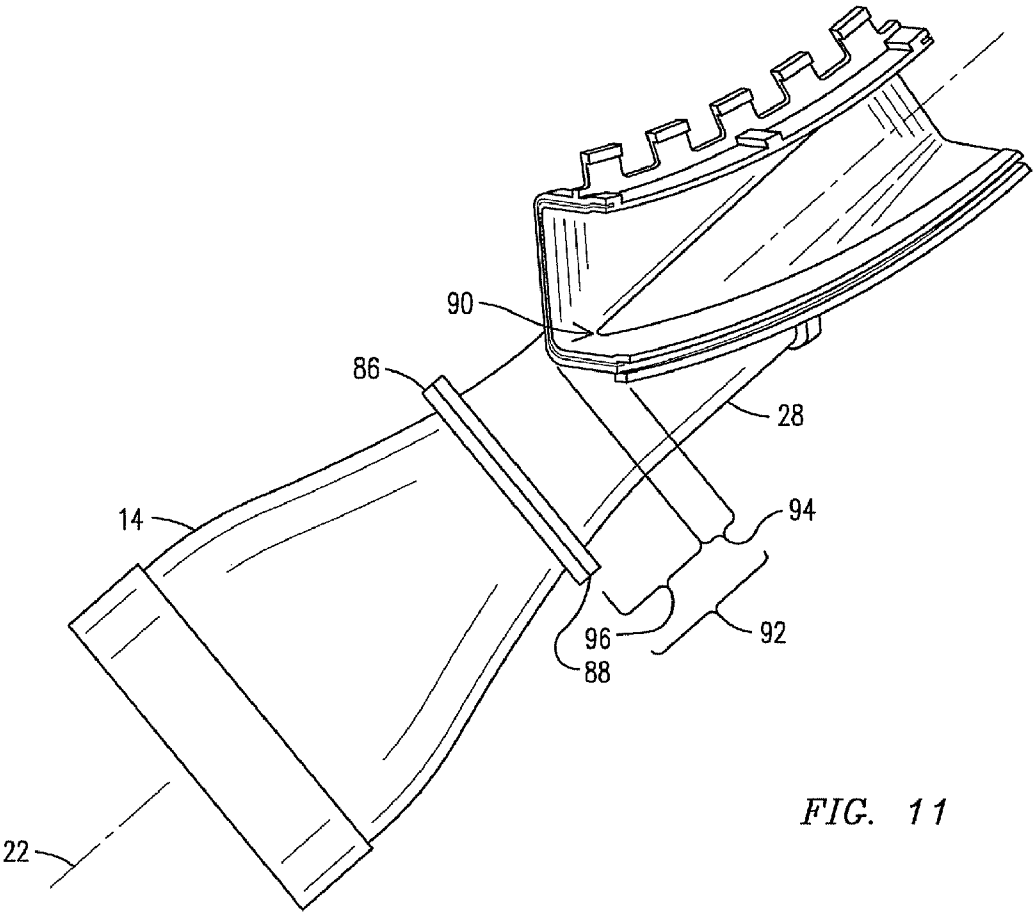
FIG. 11 shows a single flow directing structure.

FIG. 11 discloses a single flow directing structure 12 comprising a cone 14 and an associated IEP 28, connected at a cone joint 86. The flow directing structure 12 in this embodiment comprises two components. However, it could be a single component, or a combustor could serve as a combustor with a cone and could neck itself down. In this embodiment the two components are different so that the cone 14 can be made of different material than the IEP 16. The cone 14 encounters different thermal and mechanical stresses than does the IEP 16, and thus having two components offers added flexibility in design. In an embodiment it is preferred that a cone downstream end 88 have a circular cross section, so that any morphing of the overall gas flow path from a circular cross section to a non-circular cross section occurs downstream of the cone downstream end 88. Having a cone 14 with only circular cross sections makes the cone 14 easier to manufacture, and if more expensive, difficult to work materials are chosen due to mechanical and thermal loads the advantage is even greater.

In addition to properly orienting each gas flow so that no gas flow paths intersect or overlap each other, each flow directing structure 12 may do any or all of the following: morphing the flow from a circular cross section to a non-circular cross section; generating a collimated flow within the gas flow prior to transitioning it to a partially bounded gas flow, and transitioning the overall gas flow path from a fully bounded perimeter to a partially bounded perimeter before delivering each gas flow to the annular chamber 18.

In an embodiment where all requirements are executed, and the cone has only circular cross sections, the IEP then must morph the cross section from a circular cross section to a non-circular cross section, and since morphing must be completed before a flow can be made to have a collimated profile, the morphing must occur when the entire perimeter of the flow is bounded, i.e. upstream of any partially unbounded regions. As can be seen in FIG. 11, an upstream end of the partially bounded region 90 marks the point in the overall gas flow path by which the gas flow therein must have been made collimated. Since in an embodiment the cone has only circular cross sections, all morphing and smoothing of the flow must occur by the upstream end of the partially bounded region 90. If there is no throat region to further smooth the flow in the fully bounded portion of the overall gas flow path, then all morphing and smoothing must occur in a first region of transition 92. If there is a throat region 94, then all morphing must occur in a second region of transition 96, and a final smoothing can occur in the throat region 94.

In order to generate a collimated gas flow a converging gas flow path with circular cross sections can follow a convergence profile known in the art as the Witoszynski formula for convergence. The Witoszynski formula provides a uniform radius (or diameter) convergence for circular cross-sections as a function of normalized distance. The Witoszynski formula is as follows: $R/Rout=\{1-(1-1/AR)(1-x^2)^2/(1+x^2/3)^3\}^{-0.5}$, where R/Rout is the radius at length x divided by the outlet radius; AR is the (inlet area)/(outlet area) ratio; and x is the normalized distance from the inlet. The Witoszynski formula can be found in the following reference: "Witoszynski, C. 1924: ber Strahlerweiterung und Strahlablenkung. In: Vortrage aus dem Gebiet der Hydro- und Aerodynamik, Hrsg, Th. von Karman und T. Levi-Civita, Innsbruck, Springer Verlag, Berlin, S. 248-251." However, when an overall gas flow path morphs to a non-circular cross section, the Witoszynski formula no longer directly applies because the non-circular cross section has no diameter (or corresponding radius) for the Witoszynski formula, which requires one. More particularly, the Witoszynski convergence profile inherently requires a known relationship between the radius of the cross section and the area of the cross section, (as well as the shape of the cross section), and this is accomplished when all cross sectional areas are limited to circular shapes. Consequently, the converging region with non-circular cross sections must follow a uniform convergence rate some other way. In an embodiment, in an area of convergence with a non-circular cross section, an equivalent diameter for the non-circular cross section may be derived and the equivalent diameter for the non-circular cross section conforms to the Witoszynski formula. In an embodiment, an area of the non-circular cross section may be used as an area of an equivalent circular cross section, and an equivalent radius/diameter of the equivalent circular cross section may conform to the Witoszynski convergence. In another embodiment the equivalent radius/diameter may be a hydraulic diameter of the non-circular cross section. Alternately, an equivalent radius/diameter may be something other than a diameter of a circular cross section of the same area as the non-circular cross section, or a hydraulic diameter; it may be another parameter of the non-circular cross section found to work better with the Witoszynski formula in such a configuration. For example, a diagonal length of a non-circular cross section, such as a trapezoid, may be used to determine the equivalent diameter, when a relationship between the length of the diagonal and the cross sectional area is known. Furthermore, ratios or conversions of a parameter may be used to reach an equivalent diameter, such that an equivalent diameter is proportional to the parameter. Additionally, a formula for determining an equivalent diameter may incorporate one or more parameters of the non-circular cross section. This allows for flexibility in the application of the Witoszynski formula to non-circular cross sections, as there may be differences in the convergences of a circular cross section and a non-circular cross section that can be accommodated with such ratios/formulas/conversions etc.

In yet another embodiment, the convergence may use the Witoszynski profile, but may use parameters of the non-circular cross section without regard to any relationship between the parameter used and the cross sectional area, to produce a collimated flow. In such an embodiment, a largest dimension 100 of a non-circular cross section such as that shown in FIG. 12 may be used as an equivalent diameter of the non-circular cross section. The largest diameter may then follow the convergence profile meant for diameters of circular cross sections as governed by the Witoszynski formula, but this would differ from the previous embodiment in that the largest diameter may not be correlated to the cross sectional area. In other words, while Witoszynski may be used to produce collimated flow, so may variations of Witoszyinski using an equivalent radius/diameter that may or may not be correlated to the cross sectional area of the cross section they represent, as well as any method that produces the desired collimated or even uniform flow in the gas flow. The examples given are not meant to be limiting.

Figure 12:
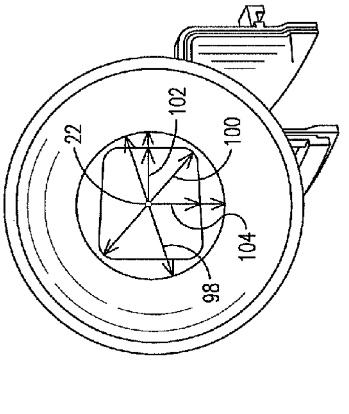
FIG. 12 provides a view down an overall gas flow path.

However, given the various configurations possible with non-circular cross sections, other restrictions may be imposed in an effort to reach a collimated flow in the flow downstream of the morphing. For example, as shown in FIG. 12, any converging region with a non-circular cross section may be required to be coaxial with the overall gas flow longitudinal axis 22 present in the area of convergence with circular cross sections. It may also be required to remain within a smallest circular cross section diameter 98. In other words, the largest dimension 100 of any non-circular cross section must be equal to or smaller than the diameter of the smallest circular cross section diameter 98. Further, it may be required that the every cross sectional dimension not diverge in any dimension, and in an embodiment may converge in every dimension. This means that all distances along the overall gas flow longitudinal axis 22 that are at a particular angular position with respect to the overall gas flow longitudinal axis 22 must not diverge and may converge. For example, all three o'clock position dimensions 102 (i.e. dimensions at 90 degrees in the figure) must not diverge and may decrease downstream along the overall gas flow longitudinal axis 22. Similarly, all six o'clock position dimensions 104, (i.e. dimensions at 180 degrees in the figure) must not diverge and may decrease downstream along the overall gas flow longitudinal axis 22. This requirement may apply to dimensions from zero degrees to 360 degrees around the overall gas flow longitudinal axis 22. However, and decrease in a dimension downstream must still ultimately conform to Witoszynski as implemented.

These requirements may be imposed because there exist circumstances when a morphing non-circular cross section could decrease in an equivalent diameter, such as a hydraulic diameter, but could actually diverge in one dimension. In this case the convergence of the non-circular cross section would conform to the Witoszynski formula but may still diverge. For example, at an upstream end a square cross section with a given area may converge to a rectangular area with a smaller area downstream, but if the rectangle were to be very thin and very long, the long dimension of the rectangle could be larger than the diameter of the smallest circular cross section upstream, which means some of the flow would actually diverge although the equivalent diameters of the non-circular cross sections were following the Witoszynski formula. Since this divergence is to be avoided the additional restrictions may be imposed.

There may be circumstances when a convergence that follows a uniform convergence profile such as that called for by the Witoszynski formula does not produce the desired collimated flow. For example, manufacturing tolerances and dynamic operating conditions may work against a collimated flow. In addition, when a non-circular cross section converging area follows the Witoszynski formula for convergence by using equivalent diameters, the flow produced simply may not be the ideal collimated flow desired. This may occur because the Witoszynski formula for convergence assumes circular cross sections. In view of the possibility of such circumstances or other unforeseen circumstances, a throat region may also be used.

Figure 13:
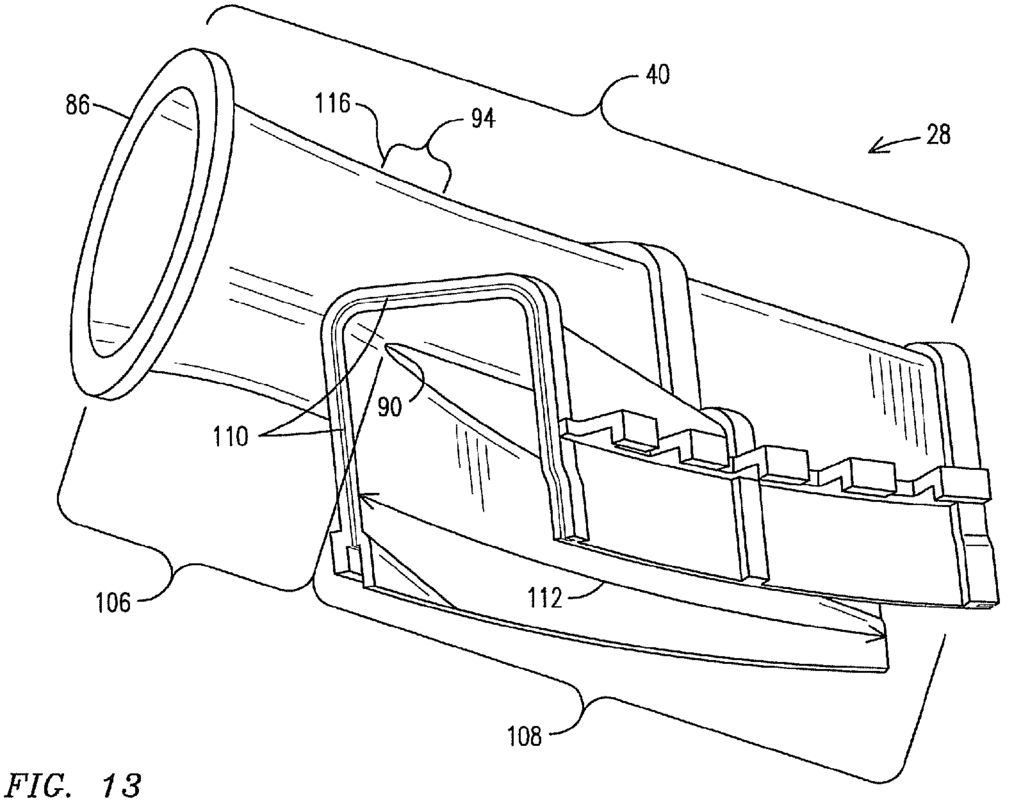
FIG. 13 shows a single integrated exit piece.

A single IEP 16 is shown in FIG. 13. Throat region 94 is visible immediately upstream of the upstream end of the partially bounded region 90. A throat region 94 is a fully bounded area of constant cross sectional shape, size, and location with respect to the overall gas flow longitudinal axis 22. Throat regions help smooth flow, and in an ideal circumstance create a collimated flow. Given that the throat is intended to smooth flow so that it does not diverge once unbounded, it follows that the throat region 94 must be located at some point upstream of the upstream end of the partially bounded region 90. If the throat region 94 is immediately upstream of the upstream end of the partially bounded region 90, the throat region 94 may act as a nozzle between the fully bounded perimeter portion and the partially unbounded portion of the overall gas flow path 50, which meet at the upstream end of the partially bounded region 90. The throat region 94 has some non-zero length. The longer it is the more effective it may be, up to a point. It has been ascertained that a throat length of at least 10% of the hydraulic diameter of the cross section of the throat is effective in smoothing flow.

From this it can be seen that an associated IEP 28 may receive a gas flow from a cone 14. The received gas flow will have a circular cross section as it enters the IEP first flow path 40. The IEP first flow path 40 may have an IEP first flow path upstream portion 106 in which the overall gas flow path 50 is fully bounded, and an IEP first flow path downstream portion 108 where the overall gas flow path 50 is partially bounded. These two may meet at the upstream end of the partially bounded region 90. Within the IEP first flow path upstream portion 106 the overall gas flow path 50 may: morph from having a circular cross section to having a non-circular cross section, and while doing so it may follow a uniform convergence to produce a collimated flow; and also comprise a throat region. Should the IEP first flow path upstream portion 106 have a throat region 94, morphing from circular to non-circular cross sections must finish at some point upstream of the throat region 94, though that point can be the throat region upstream end 116.

In an embodiment the cone joint 86 may be located far enough upstream of the IEP first flow path downstream portion 108 that any cold air leakage into the cone joint 86 not interfere with the formation of the collimated flow to be developed prior to the IEP first flow path downstream portion 108. Further, in an embodiment, upstream end of the partially bounded region 90 may be located downstream of an IEP second flow path upstream end 110. This may impart mechanical strength and reduce fluctuations in the shape of the annular chamber 18 induced by mechanical loads and thermal gradients.

It has been shown that the inventors of the innovative present arrangement have created an assembly that directs combustion exhaust gas from a combustor to a first row of turbine blades along a mostly straight overall gas flow path, while dispensing with the first row of vanes present in the first stage of conventional can annular gas turbine engines. The uniformity of the flow is increased because each discrete flow is no longer separated by walls upon delivery to the first row of blades. This reduces the range of the mechanical load oscillations the first row of blades sees, thereby increasing their service live. Furthermore, the flow is already aligned, so aerodynamic losses associated with the first row of flow redirecting vanes are eliminated, as are the costs of producing and maintain those blades. Finally, the flow directing structures are modular, so individual flow directing structures can be replaced, and if made with components, any component can be individually replaced.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An arrangement for conveying combustion gas from a plurality of can annular combustors to a turbine first stage blade section of a gas turbine engine, the arrangement comprising:

a plurality of interconnected integrated exit piece (IEP) sections defining an annular chamber oriented concentric to a gas turbine engine longitudinal axis upstream of the turbine first stage blade section;

each respective IEP comprising a first flow path section receiving and fully bounding a first flow from a respective can annular combustor along a respective common axis there between, and delivering a partially bounded first flow to a downstream adjacent IEP section; and each respective IEP further comprising a second flow path section receiving a partially bounded second flow from an upstream adjacent IEP and delivering at least part of the second flow to the turbine first stage blade section.

2. The arrangement of claim 1, wherein a first flow path section inner wall and a second flow path section inner wall share a common plane.

3. The arrangement of claim 1, wherein the first flow path section comprises a fully bounded throat region.

4. The arrangement of claim 1, wherein a first flow path section upstream end comprises a circular cross section, and wherein the first flow path section transitions to a non-circular cross section downstream of the first flow path section upstream end.

5. The arrangement of claim 4, wherein any flow path convergence conforms to the Witoszynski formula, and wherein for any converging area with a non-circular cross section an equivalent circular cross section is derived based on the non-circular cross section.

6. The arrangement of claim 5, wherein a downstream projection of a smallest circular cross section of the first flow path section entirely encompasses every non-circular cross section of the first flow path section, and wherein all dimensions of the non-circular cross sections of the first flow path section converge.

7. The arrangement of claim 1, wherein a first flow path section upstream end comprises a circular cross section.

8. An arrangement for delivering gasses from a plurality of combustors of a can annular gas turbine combustion engine to a turbine first stage blade section, the arrangement comprising a flow-directing structure for each combustor defining part of an overall gas flow path from the combustor to an annular chamber outlet, wherein each flow-directing structure comprises a cone and an integrated exit piece (IEP), wherein the cone receives a gas flow from a respective combustor and provides a cone-bounded flow path comprising a straight cone-bounded flow path longitudinal axis to the IEP;

wherein the IEP comprises a first flow path coaxial with the cone-bounded flow path and configured to deliver the gas flow received from the cone to a downstream adjacent IEP second flow path, and a second flow path comprising an upstream end coaxial with an upstream adjacent IEP first flow path and configured to receive the gas flow from the upstream adjacent IEP first flow path and deliver at least a portion of the gas flow to the annular chamber outlet, wherein the first flow path and the second flow path are geometrically discrete, wherein each IEP comprises a first flow path wall and a second flow path wall that define respective abutting top and bottom sides of the first flow path and the second flow path respectively, wherein a first flow path wall flow-side surface and a second flow path wall flow-side surface share a common plane.

9. The arrangement of claim 8, wherein each IEP comprises a third flow path configured to receive a remaining gas flow from an upstream adjacent second flow path and deliver the remaining gas flow to the annular chamber outlet.

10. The arrangement of claim 8, wherein the cone-bounded flow path comprises a circular cross section, and the first flow path comprises a non-circular cross section.

11. The arrangement of claim 10, wherein in the first flow path with the non-circular cross section, flat walls are joined via fillets, and the fillets taper in a downstream direction.

12. The arrangement of claim 10, wherein the overall gas flow path comprises a bounded perimeter upstream portion and a partially unbounded perimeter downstream portion, wherein the first flow path comprises a throat region of non-zero throat length disposed in the bounded perimeter upstream portion and downstream of a region of transition from the circular cross section to the non-circular cross section of the bounded perimeter upstream portion.

13. The arrangement of claim 12, wherein the throat length is greater than or equal to ten percent of a hydraulic diameter of the throat region.

14. The arrangement of claim 12, wherein the throat acts as a nozzle from the bounded perimeter upstream portion to the partially unbounded perimeter downstream portion.

15. The arrangement of claim 14, wherein first flow path comprises part of the bounded perimeter upstream portion and part of the partially unbounded perimeter downstream portion.

16. The arrangement of claim 12, wherein any first flow path walls downstream of the throat region that partially bound the first flow path are effective to maintain a size, shape, and direction of a cross section of the first flow path as defined by the throat region.

17. The arrangement of claim 8, wherein the overall gas flow path comprises a bounded perimeter upstream portion and a partially unbounded perimeter downstream portion, wherein an upstream end of the partially unbounded perimeter downstream portion is disposed downstream of an upstream end of the first flow path and downstream of an upstream end of the second flow path.

18. The arrangement of claim 8, wherein the overall gas flow path comprises a bounded perimeter upstream portion and a partially unbounded perimeter downstream portion, wherein the bounded perimeter upstream portion comprises a transition from a circular cross section to a non-circular cross section, and wherein the transition is configured to produce a uniform velocity profile at a location where the transition is complete.

19. The arrangement of claim 18, wherein the transition comprises a uniform convergence profile.

20. The arrangement of claim 19, wherein the uniform convergence profile is based on the Witoszynski formula.

21. The arrangement of claim 20, wherein equivalent circular cross sections are derived for any non-circular cross sections, and the equivalent circular cross sections conform to the Witoszynski formula.

22. The arrangement of claim 21, wherein the equivalent circular cross sections comprise a diameter proportional to a largest dimension of the non-circular cross sections.

23. The arrangement of claim 21, wherein the equivalent circular cross sections comprise a diameter proportional to a hydraulic diameter of the non-circular cross sections.

24. The arrangement of claim 21, wherein a downstream projection of a smallest circular cross section of the overall gas flow path entirely encompasses every non-circular cross section of the overall gas flow path, and wherein all dimensions of the non-circular cross sections converge.

25. The arrangement of claim 10, wherein the cone-bounded flow path consists of circular cross sections.

26. An arrangement for delivering gasses from a plurality of combustors of a can annular gas turbine combustion engine to a turbine first stage blade section, the arrangement comprising a flow-directing structure for each combustor defining part of an overall gas flow path from the combustor to an annular chamber outlet, wherein each flow-directing structure comprises a cone and an associated integrated exit piece (IEP), wherein the cone receives a gas flow from a respective combustor and providing a cone-bounded flow path comprising a straight cone-bounded flow path longitudinal axis to the associated IEP;

wherein IEPs together define an annular chamber oriented concentric to a gas turbine engine longitudinal axis and disposed upstream of the turbine first stage blade section;

wherein the associated IEP and at least one downstream adjacent IEP comprise an IEP flow path that spans from a cone outlet to the annular chamber outlet, the IEP flow path comprising flow defining walls that receive the gas flow from the cone coaxial with the cone-bounded flow path and deliver the gas flow to the annular chamber;

wherein flow-side surfaces of the flow defining walls that define boundaries of abutting areas of adjacent flows share a common plane; and wherein the flow defining walls initially entirely bound a perimeter of the IEP flow path, and wherein no flow defining walls separate adjacent flows at the annular chamber outlet.

27. The arrangement of claim 26, wherein at least a portion of each IEP flow path spans an additional downstream IEP.

28. The arrangement of claim 26, wherein the cone-bounded flow path comprises a circular cross section and the flow defining walls define a flow path comprising a non-circular cross section.

29. The arrangement of claim 28, wherein in the non-circular cross section, adjacent flow path walls are joined by a fillet and a radius of the fillet decreases in a downstream direction.

30. The arrangement of claim 26, wherein the overall gas flow path comprises a bounded perimeter upstream portion and a partially unbounded perimeter downstream portion, wherein the flow defining walls comprise a throat region of non-zero throat length disposed in the bounded perimeter upstream portion and downstream of all changes to a bounded perimeter upstream portion cross sectional shape.

31. The arrangement of claim 30, wherein the throat length is greater than or equal to ten percent of a hydraulic diameter of the throat region.

32. The arrangement of claim 30, wherein the throat acts as a nozzle from the bounded perimeter upstream portion to the partially unbounded perimeter downstream portion.

33. The arrangement of claim 30, wherein interior surfaces of flow defining walls downstream of the throat region match an interior boundary of downstream projections of throat region walls.

34. The arrangement of claim 26, wherein the overall gas flow path comprises a bounded perimeter upstream portion and a partially unbounded perimeter downstream portion, wherein the bounded perimeter upstream portion comprises a transition from a circular cross section to a non-circular cross section, and wherein the transition is configured to produce a uniform velocity profile at a location where the transition is complete.

35. The arrangement of claim 26, wherein any overall gas flow path convergence conforms to the Witoszynski formula, and wherein for any converging area with a non-circular cross section an equivalent circular cross section is derived based on the non-circular cross section.

36. The arrangement of claim 26, wherein a downstream projection of a smallest circular cross section of the overall gas flow path entirely encompasses every non-circular cross section of the overall gas flow path, and wherein all dimensions of the non-circular cross sections converge.

37. The arrangement of claim 26, wherein the cone-bounded flow path consists of circular cross sections.

38. An arrangement for delivering gasses from a plurality of combustors of a can annular gas turbine combustion engine to a turbine first stage blade section, the arrangement comprising a flow-directing structure for each combustor defining part of an overall flow path from the respective combustor to an annular chamber outlet, wherein each flow-directing structure comprises a cone and an integrated exit piece (IEP), wherein the cone receives a gas flow from a respective combustor and delivers the gas flow to the IEP;

wherein the cone defines a fully bounded, circular cross section, axially straight, converging first portion of the overall flow path, wherein the IEP defines a fully bounded, circular cross section to non-circular cross section, second portion of the overall flow path coaxial with the first portion, wherein the overall flow path at a downstream end of the second portion comprises a collimated flow, and wherein the IEP and at least one downstream adjacent IEP define a partially bounded, third portion of the overall flow path, wherein an upstream end of the third portion partially bounds a flow path cross section that is coaxial with the second portion and has a same cross section shape as a second portion downstream end cross section shape, and wherein the third portion delivers the gas flow to the annular chamber outlet.

39. The arrangement of claims 38, wherein the third portion of the overall flow path requires an additional downstream IEP.

40. The arrangement of claims 38, wherein surfaces that define boundaries of abutting areas of adjacent flows share a common plane.

41. The arrangement of claims 38, wherein the second portion of the overall flow and the third portion of the overall flow path share common flow defining walls in the IEP.

42. The arrangement of claim 38, wherein the second portion of the overall flow path comprises a fully bounded throat region.

43. The arrangement of claim 38, wherein any overall flow path convergence conforms to the Witoszynski formula, and wherein for any converging area with a non-circular cross section an equivalent circular cross section is derived based on the non-circular cross section.

44. The arrangement of claim 43, wherein a downstream projection of a smallest circular cross section in the second portion entirely encompasses every non-circular cross section in the second portion, and wherein all dimensions of the non-circular cross sections converge.

45. The arrangement of claim 38, wherein a first flow path section upstream end comprises a circular cross section.

46. The arrangement of claim 38, wherein the non-circular cross section comprises a fillet and wherein the fillet decreases in radius in a downstream direction.

47. An arrangement for delivering gasses from a plurality of combustors of a can annular gas turbine combustion engine to a turbine first stage blade section, the arrangement comprising a flow-directing structure for each combustor defining part of an overall flow path from the respective combustor to an annular chamber outlet, wherein each flow-directing structure comprises a cone and an IEP, wherein the cone receives a gas flow from a respective combustor and delivers the gas flow to the integrated exit piece (IEP);

wherein the cone defines a fully bounded, circular, straight, converging first portion of the overall flow path, wherein the IEP defines a fully bounded, circular cross section to non-circular cross section, second portion of the overall flow path coaxial with the first portion, wherein the overall flow path at a downstream end of the second portion comprises a collimated flow, and wherein the IEP and at least one downstream adjacent IEP define a partially bounded, third portion of the overall flow path, wherein an upstream end of the third portion partially bounds a flow path cross section that is initially coaxial with and matches a second portion downstream end cross section shape, and wherein the third portion delivers the gas flow to the annular chamber outlet, wherein surfaces of the IEP that define boundaries of abutting areas of adjacent flows share a common plane, wherein the second portion of the overall flow and the third portion of the overall flow path share common flow defining walls, and wherein the second portion of the overall flow path comprises a fully bounded throat region, wherein the overall flow path conforms to the Witoszynski formula, and wherein for any converging area with a non-circular cross section an equivalent circular cross section is derived based on the non-circular cross section, wherein a downstream projection of a smallest circular cross section in the second portion entirely encompasses every non-circular cross section in the second portion, and wherein all dimensions of the non-circular cross sections converge, and wherein a first flow path section upstream end comprises a circular cross section.

* * * * *